United States Patent
Kowal

[15] 3,660,884
[45] May 9, 1972

[54] HAND TOOL FOR CONNECTING A FITTING TO A DUCT END

[72] Inventor: Leonard J. Kowal, Prospect Heights, Ill.
[73] Assignee: Imperial-Eastman Corporation, Chicago, Ill.
[22] Filed: Nov. 14, 1969
[21] Appl. No.: 876,942

[52] U.S. Cl. ............................................................29/237
[51] Int. Cl. .......................................................B23p 19/04
[58] Field of Search................29/523, 237, 255, 272, 256, 29/280, 282

[56] References Cited

UNITED STATES PATENTS

| | | | |
|---|---|---|---|
| 2,219,266 | 10/1940 | Hirsch | 29/237 X |
| 1,753,005 | 4/1930 | Grady | 29/237 X |
| 2,262,171 | 11/1941 | Downes | 29/237 X |
| 2,294,640 | 9/1942 | Wallace | 29/523 |
| 2,733,940 | 2/1956 | Millar | 29/237 X |

Primary Examiner—Andrew R. Juhasz
Assistant Examiner—Leon Gilden
Attorney—Hofgren, Wegner, Allen, Stellman & McCord

[57] ABSTRACT

A tool for connecting a fitting to a duct end wherein an insert is radially expanded to clamp the duct end against an outer shell received in a nut member of the fitting. The tool includes means for threading the nut member onto one end of the tool and a punch for movement axially through the insert to effect the desired expansion thereof while the insert and shell are held in place by the nut. The punch is carried on a force member which is reciprocated by manually operable means herein comprising a ratchet mechanism. The means for holding the nut is replaceable to permit a substitution of different size nuts. The punch is removably secured to the force member to permit the substitution of different size punches. Thus, different size fittings may be readily made up with the tool.

11 Claims, 7 Drawing Figures

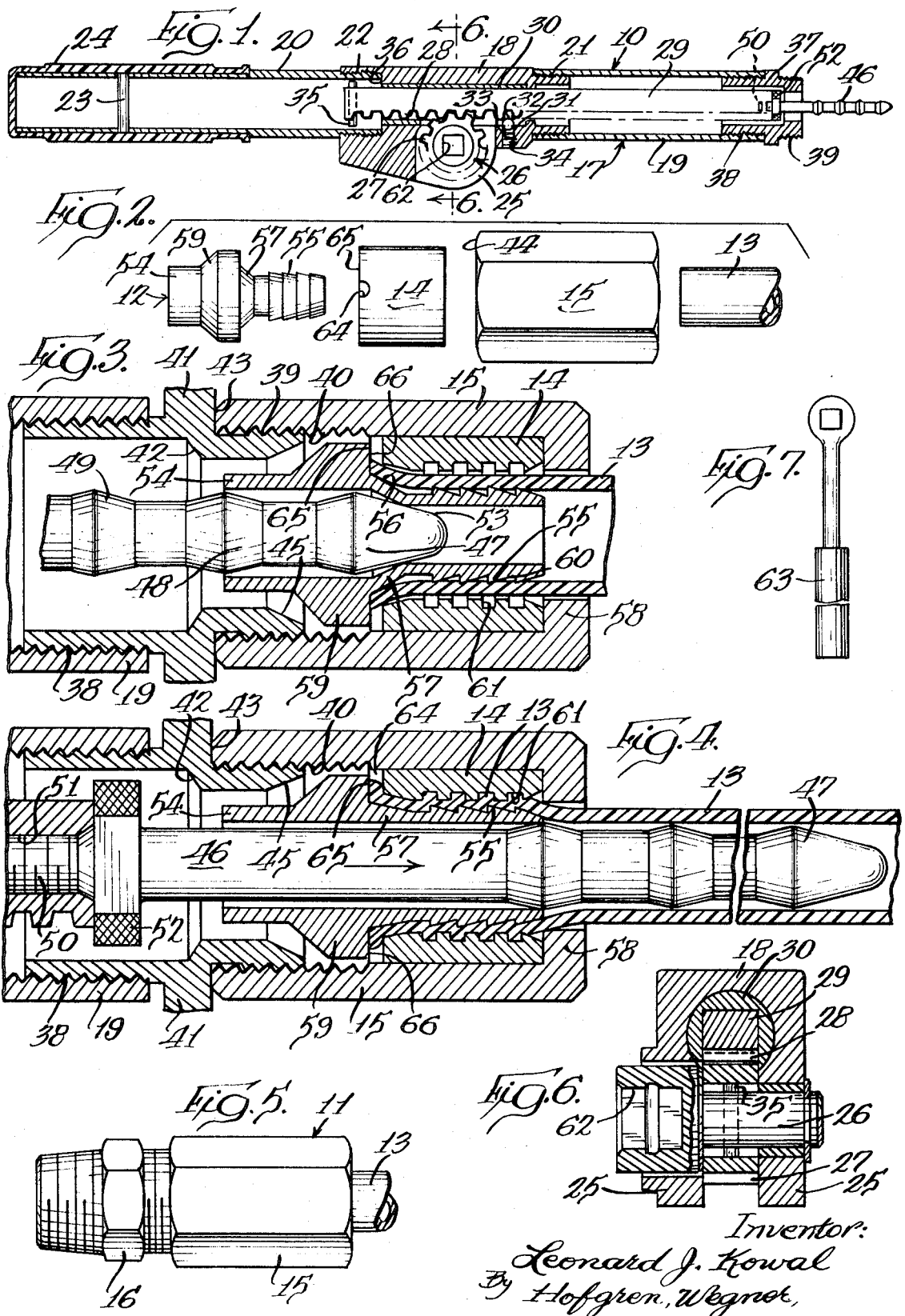

3,660,884

HAND TOOL FOR CONNECTING A FITTING TO A DUCT END

BACKGROUND OF THE INVENTION

1. Field of the Invention

This invention relates to tools for making up fittings, and in particular to tools for connecting a fitting to a duct end by radial expansion of an internal portion of the fitting.

2. Description of the Prior Art

In one form of improved duct fitting, a relatively rigid insert is provided within the duct end. In mounting the insert to the end of the duct, such as a metal or plastic tube or hose, the insert is conventionally forcibly urged axially to within the duct end. An annular shell is disposed about the duct end and is crimped radially inwardly to clamp the duct end sealingly between the shell and the internally received insert. The insert and shell are thereby fixed to the end of the duct for suitable cooperation with a nut and body member of the fitting sealingly engaging the assembled insert and shell structure.

In one modified form of such insert type fitting, the insert is provided originally with an outside diameter suitable to be received within the duct end. The insert, however, is adapted to be expanded radially outwardly by suitable punch, or swaging tool. The shell is made relatively rigid and is provided with an outside diameter suitable to permit the shell to be fitted about the outside of the duct end. Thus, upon radial expansion of the insert, the duct end is pressed outwardly against the shell and is effectively sealingly clamped between the shell and the expanded insert in connecting the insert and shell to the duct end. The assembled insert and shell are then connected in the fitting by suitable manipulation of the nut and body members.

To permit the make-up of such an expanded insert fitting in the field, it is desirable to provide a hand tool which may be easily operated to accurately make up the fitting.

SUMMARY OF THE INVENTION

The present invention comprehends the provision of a highly efficient hand tool for making up such an expanded insert type fitting in a novel and simple manner.

More specifically, the present invention comprehends the provision of such a tool wherein the insert and shell are disposed for make-up within the nut member of the fitting, the tool having means for engagement by the nut member whereby the nut member serves as the positioning means for the insert and shell during the make-up operation. The tool includes manually operable punch means for internally swaging the insert to expand it radially into sealed clamped association with the tube end and the surrounding shell. The tool includes a force member and means on the force member for removably connecting the punch thereto. The tool further includes removable means for connection of the nut member thereto. Thus, different size nuts and punches may be utilized for making up different size fittings.

The tool comprises a substantially rectilinear apparatus having a handle at one end and the punch movably carried at the opposite end with ratchet means intermediate the ends for effecting hand operation of the tool. Cooperating stop means are provided on the nut retaining means and punch for limiting the insertion of the punch through the insert. Further stop means are provided for preventing withdrawal of the force member during substitution of the nut retaining means and punch.

BRIEF DESCRIPTION OF THE DRAWING

Other features and advantages of the invention will be apparent from the following description taken in connection with the accompanying drawing wherein:

FIG. 1 is a diametric section of a hand tool embodying the invention;

FIG. 2 is an exploded side elevation of a fitting suitable for make-up by the tool;

FIG. 3 is a fragmentary enlarged diametric section illustrating a first step in the make-up of the fitting in the tool;

FIG. 4 is a fragmentary enlarged diametric section illustrating a second step in the make-up of the fitting;

FIG. 5 is a side illustration of the made-up fitting secured to the duct end;

FIG. 6 is an enlarged transverse section taken substantially along the line 6—6 of FIG. 1; and FIG. 7 is a side elevation of a handle for use in operating the ratchet mechanism of a tool.

DESCRIPTION OF THE PREFERRED EMBODIMENTS

In the exemplary embodiment of the invention as disclosed in the drawing, a tool generally designated 10 is shown to comprise a hand tool for making up a fitting generally designated 11. The fitting comprises an internally expanded type fitting wherein an insert 12 is radially expanded to clamp a duct end 13 sealingly outwardly against a tubular shell 14. The fitting further includes an outer nut member 15 adapted to be connected to a suitable male element such as body member 16 shown in FIG. 5. Such fittings have been found to provide improved high pressure connection of tube ducts such as plastic tubes and the like. The present invention comprehends an improved tool 10 for permitting the fitting to be made-up by hand as in the field.

As best seen in FIG. 1, tool 10 includes a housing generally designated 17 including a tubular mid-portion 18, a tubular front portion 19, and a tubular rear portion 20, portions 18, 19 and 20 being threadedly connected by suitable threaded means 21 and 22 respectively. A crosspin 23 may be provided for reinforcing rear portion 20. A suitable handle grip 24 may be mounted on rear portion 20 for facilitated grasping of the tool by the user.

Mid-portion 18 includes depending wall means 25 pivotally mounting a ratchet wheel 26 having teeth 27 meshing with corresponding teeth 28 on a force member 29 extending coaxially through portion 18 and front portion 19 of housing 17. The force member 29 may be slidably mounted in a sleeve bearing 30 carried in mid-portion 18. A releasable retaining device 31 is further mounted in the mid-portion 18 including a ball 32, coil spring 33, and plug 34. Spring 33 yieldingly urges the ball 32 against the ratchet 28 of force member 29 so as to tend to hold the force number 29 against axial movement when the ratchet is not being operated.

A stop pin 35 is fixed in the rear end of force member 29 to engage a rear shoulder 36 on housing mid-portion 18 for limiting the forward axial movement of the force member.

An annular retaining member 37 is threadedly secured by threaded means 28 to the front end of the forward housing portion 19. Retaining member 37 includes a forward external threaded portion 39 adapted to be threadedly engaged by the internal thread 40 of nut member 15. The mid-portion 41 of retaining member 37 may be suitably serrated for facilitated manipulation thereof in installing and removing the retaining member on the forward end of the housing portion 19. The mid-portion 41 further defines a rearwardly facing stop shoulder 42. Mid-portion 41 of the retaining member further defines a forwardly facing outer surface 43 adapted to be engaged by the rear end 44 of the nut member 15 when the nut member is fully threaded onto the threaded portion 39. The retaining member further defines an end surface 45.

Radial expansion of insert 14 is effected by a punch, or swage tool, 46 having a plurality of raised surfaces, such as surfaces 47, 48, and 49, as seen in FIG. 3. The punch is removably connected to the forward end of the force member 29 by a suitable threaded connector 50 received in a corresponding threaded recess 51 coaxially in the end of the force member. The punch may be provided with a suitable knurled collar 52 for facilitated hand manipulation of the punch in mounting and unmounting the punch relative to the force member end. The punch includes a tapered nose portion 53 arranged for facilitated entry into the rear end portion 54 of insert 12 as may be seen in FIG. 3.

Raised surfaces 47, 48, and 49 are of increasingly larger diameter to effect an expansion of the forward insert portion from the original configuration of FIG. 3 to the final configuration of FIG. 4 wherein the internal diameter of the forward portion 55 is substantially equal to the internal diameter of the rearward portion 54 and as seen in FIG. 4, preferably substantially equal to the inner diameter of the duct end 13. Illustratively, the difference in diameters of the respective surfaces 47, 48, and 49 may be approximately 0.01 inch whereby the three surfaces of punch 46 may be arranged to radially expand the insert portion 55 a total of 0.03 inch.

The insert 12 and shell 14 are captured within the nut member 15 during the make-up of the fitting as seen in FIGS. 3 and 4. More specifically, to assemble the fitting 11 on the duct end 13, the user firstly moves the nut member over the end of the duct, then moves the shell coaxially onto the duct end and inserts the forward portion 55 of the insert into the duct end until the distal portion 56 of the duct end expands onto a frustoconical connecting portion 57 of the insert. The nut member is then threaded onto retaining member portion 39 until the end 44 of the nut member abuts the retaining member 43 whereby the insert and shell are captured within the nut member between the end surface 45 of the retaining member and the outer inserted flange 58 of the nut member, as seen in FIG. 3. The spacing between retaining member surface 45 and flange 58 is preferably somewhat greater than the cumulative length of the shell 14 and an enlarged mid-portion 59 of the insert.

As best seen in FIG. 3, the outer surface 60 of the insert portion 55 may be toothed and the inner surface 61 of the shell 14 may be toothed for improved gripping engagement with the duct end.

With the fitting parts and tube end connected to the retaining member 37, as shown in FIG. 3, the user may then operate ratchet 26 to advance the punch 46 into the insert end 54 and into engagement with the forward insert portion 55. As best seen in FIG. 1, the punch 46 is effectively cantilevered from the bearing 30 so that the punch is self-centering in entering the insert. Forward movement of the punch is continued until each of the three large surfaces 47, 48, and 49 has passed fully through the insert portion 55 to complete the radial expansion thereof and thereby effect the desired sealed clamping of the duct end 13 between the insert portion 55 and shell 14. The spacing of the last enlarged surface 49 from the collar 52 is preselected to assure the full travel thereof through the insert before collar 52 strikes stop shoulder 42 on the retaining member, thereby preventing further forward movement of the punch.

Ratchet 26 may now suitably be reversely operated to withdraw punch 46 from the now made-up assembly of the insert and shell. As the punch is withdrawn, the insert moves therewith until the mid-portion 59 abuts retaining member surface 45, thereby preventing further withdrawal movement of the insert and permitting the punch to be axially withdrawn therefrom. Upon such withdrawal, the made-up fitting may then be disconnected from the tool by suitable unthreading of nut member 15 from retaining member portion 39. The insert and shell are fixedly secured to the end of the duct while the nut member is slidably movable thereover for subsequent connection to a suitable male element, such as fitting body 16 shown in FIG. 5.

As indicated above, the threaded connection of the retaining member 37 to the housing portion 19 permits different size retaining members to be substituted in tool 10 as desired. Similarly, corresponding substitution of the punch 46 is permitted by the threaded association of the punch portion 50 with the threaded recess 51. Illustratively, the tool is adapted for use in making up fittings of the above discussed type in ¼ inch, ⅜ inch, ½ inch, ¾ inch size, etc.

When the retaining member 37 and punch 46 are removed for substitution, the pin 35 effectively precludes withdrawal of the force member 29 from the housing 17 by its engagement with housing mid-portion stop shoulder 36. However, should it be desirable to remove force member 29 from the housing, rear portion 20 of the housing may be unthreaded from mid-portion 18 thereof permitting the force member to be withdrawn rearwardly therefrom.

Ratchet 26 may be provided with a suitable recess 62 for receiving suitable portion of a connectible handle 63, as shown in FIG. 7, for use in operating the ratchet mechanism. Thus, when not in use, the handle may be disconnected from the tool permitting the tool to be stored effectively in minimum space.

Shell 14 may be provided with a diametrically opposite pair of recesses 64 in the rear edge 65 thereof to permit the user to determine the proper positioning of the duct end 13 fully on the frustoconical portion 56 of the insert. As seen in FIG. 3, rear edge 65 abuts a front edge 66 on the insert mid-portion 59 and the shell 14 is urged against flange 58 as a result of the movement of the punch 46 axially into the insert. Thus, the shell is automatically maintained in proper disposition radially outwardly of the insert portion 55 during make-up of the fitting.

The foregoing disclosure of specific embodiments is illustrative of the broad inventive concepts comprehended by the invention.

I claim:

1. Tool means for making up a fitting wherein an insert is radially expanded to clamp a tubular duct end against an outer shell received in a separate nut member provided with a threaded connecting portion at one end and shoulder means for limiting axial movement of the shell through the nut in a direction toward the other end of the nut member, said tool means comprising:

a punch having at one end means for radially expanding the fitting insert uniformly as an incident of a movement of said punch means coaxially through said insert;

means coaxially circumjacent said punch for threaded association of the nut connection portion therewith for holding the nut with the insert fixedly abutting one end of the shell and the shell fixedly abutting said nut member shoulder to locate the shell axially accurately relative to the insert during movement of said punch means coaxially through the insert; and manually operable means for moving said punch to urge said punch means coaxially through the positionally held insert with a duct end coaxially overlying said insert thereby to clamp said duct end sealingly between the resultingly radially expanded insert and the substantially rigid fitting shell in a preselected radial relationship determined by the abutment of the insert with the shell being maintained by the action of the punch means against the insert during the expansion of the insert, said nut effectively defining a portion of the tool means during the make-up of the fitting and remaining as a portion of the fitting upon completion of the make-up, said nut being axially movably retained on the tubular duct in the made-up arrangement of the fitting on the duct end and said abutment of the shell with said nut member and the insert with said one end of the shell effectively positively retaining the shell against axial outward movement relative to the insert in the made-up arrangement of the fitting.

2. The tool of claim 1 wherein said punch further includes means defining a stop shoulder, and said means for holding the nut further defines stop means for cooperation with said punch stop shoulder to limit the movement of said punch through said insert.

3. The tool of claim 1 further including a housing, and means for removably securing thereto said nut holding means whereby different nut holding means for holding different size nuts may be selectively secured thereto.

4. The tool of claim 1 wherein said manually operably means includes a force member and means are provided for removably securing said punch to said force member whereby different punches for expanding different size inserts may be selectively secured thereto.

5. The tool of claim 1 wherein said manually operable means includes a force member, said punch being carried at one end of said force member, and means for slidably mounting said force member at a substantial distance from said punch whereby said one end of the force member is effectively cantilevered for self-centering of said punch relative to said insert.

6. The tool of claim 1 wherein said means for holding the nut is arranged to dispose the nut suitably to define an axial clearance at the end of the insert adjacent the means for holding the nut.

7. The tool of claim 1 wherein said manually operable means includes a housing, a force member in said housing, means for removably connecting said punch to one end of said force member to extend outwardly from said housing, means on said punch for preventing withdrawal of said punch from said housing, and stop means for preventing withdrawal of said force member from said housing notwithstanding a removal of said punch from said force member.

8. The tool of claim 1 wherein said manually operable means comprises ratchet means.

9. The tool of claim 1 further including handle means for holding the tool during make-up of a fitting connection on a duct end, said handle means extending coaxially to said punch.

10. The tool of claim 1 further including a housing, handle means on one end of said housing, said punch extending outwardly from an opposite end of said housing, and said manually operable means including manipulating means disposed intermediate said housing ends.

11. The tool of claim 10 wherein said means for holding the nut includes stop means for preventing movement of said radially expanded insert from the nut as an incident of axial withdrawal of the punch upon completion of the expansion of said insert.

* * * * *